United States Patent
Lee et al.

(10) Patent No.: US 11,054,618 B2
(45) Date of Patent: Jul. 6, 2021

(54) OPTICAL IMAGING SYSTEM AND PORTABLE ELECTRONIC DEVICE INCLUDING THE SAME

(71) Applicant: Samsung Electro-Mechanics Co., Ltd., Suwon-si (KR)

(72) Inventors: Tae Youn Lee, Suwon-si (KR); Jin Hwa Jung, Suwon-si (KR); Yong Joo Jo, Suwon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 0 days.

(21) Appl. No.: 16/701,331

(22) Filed: Dec. 3, 2019

(65) Prior Publication Data

US 2020/0103632 A1  Apr. 2, 2020

Related U.S. Application Data

(63) Continuation of application No. 15/615,927, filed on Jun. 7, 2017.

(30) Foreign Application Priority Data

Dec. 29, 2016 (KR) .................. 10-2016-0182148

(51) Int. Cl.
*G02B 13/00* (2006.01)
*G02B 13/02* (2006.01)

(52) U.S. Cl.
CPC ..... *G02B 13/0045* (2013.01); *G02B 13/0065* (2013.01); *G02B 13/02* (2013.01)

(58) Field of Classification Search
None
See application file for complete search history.

(56) References Cited

U.S. PATENT DOCUMENTS 5,787,313 A * 7/1998 Compton ............... G03B 17/48
                                                              396/80
2004/0051960 A1   3/2004 Mihara
(Continued)

FOREIGN PATENT DOCUMENTS

CN   103907044 A   7/2014
CN   105359006 A   2/2016
(Continued)

OTHER PUBLICATIONS

United States Office Action dated Feb. 24, 2020 in related U.S. Appl. No. 15/615,927 (7 pages in English).
(Continued)

*Primary Examiner* — Christopher Stanford
*Assistant Examiner* — Journey F Sumlar
(74) *Attorney, Agent, or Firm* — NSIP Law (57) ABSTRACT

An optical imaging system includes a plurality of lenses disposed along an optical axis, and a reflection member disposed to be closer to an object than all of the plurality of lenses and having a reflection surface configured to change a path of light. The plurality of lenses are spaced apart from each other by preset distances along the optical axis, and the condition 0.8<TTL/ft<1.1 is satisfied, where TTL is a distance from an object-side surface of a lens closest to the object among the plurality of lenses to an imaging plane of an image sensor, and ft is an overall focal length of an optical system including the plurality of lenses.

17 Claims, 8 Drawing Sheets

(56) References Cited

U.S. PATENT DOCUMENTS

| | | |
|---|---|---|
| 2007/0109661 A1 | 5/2007 | Bito et al. |
| 2007/0126911 A1 | 6/2007 | Nanjo |
| 2009/0303612 A1 | 12/2009 | Fukuta et al. |
| 2012/0087019 A1 | 4/2012 | Tang et al. |
| 2013/0235463 A1 | 9/2013 | Chen et al. |
| 2015/0029601 A1 | 1/2015 | Dror et al. |
| 2016/0187620 A1 | 6/2016 | Huang |
| 2016/0227089 A1 | 8/2016 | Lin et al. |
| 2017/0276954 A1* | 9/2017 | Bajorins ............ G02B 27/149 |
| 2018/0180847 A1 | 6/2018 | Yoo |
| 2018/0188501 A1 | 7/2018 | Lee et al. |

FOREIGN PATENT DOCUMENTS

| | | |
|---|---|---|
| CN | 105467563 A | 4/2016 |
| CN | 107436482 A | 12/2017 |
| CN | 207164345 U | 3/2018 |
| CN | 108254997 A | 7/2018 |
| JP | 2007-164157 A | 6/2007 |
| JP | 2007-306282 A | 11/2007 |
| JP | 2016-523389 A | 8/2016 |
| KR | 10-2007-0052213 A | 5/2007 |
| KR | 10-2016-0000759 A | 1/2016 |
| KR | 10-2016-0109473 A | 9/2016 |
| WO | WO 2013/065972 A1 | 5/2013 |
| WO | WO 2015/001440 A1 | 1/2015 |

OTHER PUBLICATIONS

Chinese Office Action dated Dec. 9, 2019 issued in the related Chinese Patent Application No. 201710681233.6 (13 pages in English, 10 pages in Chinese).

Korean Office Action dated May 31, 2018 in corresponding Korean Patent Application No. 10-2016-0182148 (4 pages in English and 4 pages in Korean).

U.S. Office Action dated Aug. 4, 2020 issued in the Parent Application, U.S. Appl. No. 15/615,927.

Korean Office Action dated Apr. 9, 2021 in counterpart Patent Application No. 10-2019-0156055 (6 pages in English, 5 pages in Korean).

* cited by examiner

| SURFACE NO. | RADIUS OF CURVATURE | THICKNESS, GAP | FOCAL LENGTH | REFRACTIVE INDEX | ABBE NUMBER |
|---|---|---|---|---|---|
| Object | infinity | D0 | | | |
| Mirror | infinity | D1 | | | |
| Stop | infinity | −0.6 | | | |
| 1* | 2.56 | 1.30 | 4.67 | 1.531 | 55.79 |
| 2* | −72.50 | 0.57 | | | |
| 3* | infinity | 0.33 | −5.35 | 1.635 | 23.89 |
| 4* | 3.43 | 0.97 | | | |
| 5* | 5.24 | 0.72 | 69.27 | 1.535 | 55.71 |
| 6* | 5.81 | 1.40 | | | |
| 7* | −10.97 | 0.85 | 10.71 | 1.650 | 21.47 |
| 8* | −4.42 | 0.15 | | | |
| 9* | −4.47 | 0.48 | −8.40 | 1.535 | 55.71 |
| 10* | −491.91 | 2.48 | | | |
| 11 | infinity | 0.21 | | 1.52 | 64.2 |
| 12 | infinity | D2 | | | |
| image | infinity | 0 | | | |

FIG. 4

|  | FIRST POSITION | SECOND POSITION | THIRD POSITION |
|---|---|---|---|
| D0 | infinity | 1500 | 400 |
| D1 | 0.48026 | 0.40557 | 0.19 |
| D2 | 0.217 | 0.292 | 0.506 |
| $FOV_t$ | 16.691 | 16.561 | 16.194 |
| Fno | 2.892 | 2.924 | 3.013 |

FIG. 5

|  | K | A | B | C | D | E | F |
|---|---|---|---|---|---|---|---|
| 1 | -1.00000 | 7.38682E-03 | 4.86932E-04 | 2.96053E-05 | 9.22803E-06 | 0.00000E+00 | 0.00000E+00 |
| 2 | 0.00000 | 3.24334E-03 | -6.35065E-04 | 1.02132E-04 | -1.29136E-05 | 2.38658E-07 | 0.00000E+00 |
| 3 | 0.00000 | -7.11234E-03 | 5.47557E-03 | -1.44556E-03 | 1.34576E-04 | 0.00000E+00 | 0.00000E+00 |
| 4 | 0.00000 | -1.80620E-03 | 7.24692E-03 | 1.46320E-03 | -1.04380E-03 | 2.92079E-04 | 0.00000E+00 |
| 5 | 0.00000 | 4.06658E-03 | -1.00723E-03 | 2.51854E-03 | -6.00392E-04 | 3.79728E-05 | 0.00000E+00 |
| 6 | 6.57899 | 2.75384E-03 | -2.71702E-04 | 8.01665E-04 | 2.50982E-04 | -8.37032E-05 | -3.20764E-06 |
| 7 | 20.72923 | -9.63698E-03 | 5.50080E-04 | -1.11026E-03 | -4.80208E-05 | 4.88751E-05 | 0.00000E+00 |
| 8 | 0.00000 | -3.88977E-03 | -1.13049E-03 | -4.29312E-04 | 7.87050E-05 | 0.00000E+00 | 0.00000E+00 |
| 9 | 0.00000 | -2.29565E-02 | -1.32054E-03 | 2.24381E-03 | -3.60831E-04 | 1.11426E-05 | 0.00000E+00 |
| 10 | 0.00000 | -2.98062E-02 | 3.23350E-03 | 3.06148E-04 | -1.07807E-04 | 5.40495E-06 | 0.00000E+00 |

| SURFACE NO. | RADIUS OF CURVATURE | THICKNESS, GAP | FOCAL LENGTH | REFRACTIVE INDEX | ABBE NUMBER | |
|---|---|---|---|---|---|---|
| Object | infinity | D0 | | | | |
| Stop | Infinity | 0.0 | | | | |
| 1 | infinity | 2.32 | | 1.531 | 55.79 | Prism front |
| 2 | infinity | 2.32 | | 1.531 | 55.79 | Prism |
| 3 | infinity | D1 | | | | Prism rear |
| 4* | 2.45 | 1.36 | 4.41 | 1.531 | 55.79 | Lens1 |
| 5* | −46.24 | 0.43 | | | | |
| 6* | 101.65 | 0.26 | −5.74 | 1.635 | 23.89 | Lens2 |
| 7* | 3.55 | 0.38 | | | | |
| 8* | 6.79 | 0.50 | −52.75 | 1.531 | 55.79 | Lens3 |
| 9* | 5.33 | 3.11 | | | | |
| 10* | −11.67 | 0.85 | 9.96 | 1.650 | 21.47 | Lens4 |
| 11* | −4.32 | 0.23 | | | | |
| 12* | −3.54 | 0.42 | −7.52 | 1.531 | 55.79 | Lens5 |
| 13* | −31.18 | 1.48 | | | | |
| 14 | infinity | 0.21 | | 1.517 | 64.2 | IR Filter |
| 15 | infinity | D2 | | | | |
| image | infinity | 0.0 | | | | |

FIG. 9

|  | FIRST POSITION | SECOND POSITION | THIRD POSITION |
|---|---|---|---|
| D0 | infinity | 1500 | 400 |
| D1 | 0.44081 | 0.36436 | 0.15 |
| D2 | 0.194 | 0.270 | 0.485 |
| $FOV_t$ | 15.255 | 15.169 | 14.922 |
| Fno | 2.892 | 2.924 | 3.016 |

FIG. 10

|  | K | A | B | C | D | E | F |
|---|---|---|---|---|---|---|---|
| 4 | -1.00000 | 8.13477E-03 | 6.77539E-04 | 2.01968E-05 | 8.75635E-06 | 0.00000E+00 | 0.00000E+00 |
| 5 | 0.00000 | 2.58313E-03 | -3.94058E-04 | 8.98733E-05 | -2.88763E-05 | 2.70281E-06 | 0.00000E+00 |
| 6 | 0.00000 | -4.24261E-03 | 6.19984E-03 | -1.20585E-03 | 2.63783E-05 | 0.00000E+00 | 0.00000E+00 |
| 7 | 0.00000 | 3.83241E-03 | 9.10380E-03 | 1.39752E-03 | -4.91670E-04 | 3.17706E-04 | 0.00000E+00 |
| 8 | 0.00000 | 8.95057E-03 | -3.57993E-03 | 2.56675E-03 | -6.22017E-04 | 1.11903E-04 | 0.00000E+00 |
| 9 | 7.64558 | 8.29530E-03 | -3.10916E-03 | -2.77598E-04 | 1.98543E-04 | -1.14034E-04 | 1.54443E-08 |
| 10 | 21.73772 | -5.55351E-03 | 9.55550E-04 | -3.74792E-04 | -1.03372E-04 | 2.09765E-05 | 0.00000E+00 |
| 11 | 0.00000 | -1.09848E-03 | -8.60164E-04 | -1.27493E-04 | 8.76812E-06 | 0.00000E+00 | 0.00000E+00 |
| 12 | 0.00000 | -1.36980E-02 | -1.58239E-03 | 1.88405E-03 | -2.91689E-04 | 1.11426E-05 | 0.00000E+00 |
| 13 | 0.00000 | -2.59040E-02 | 2.48553E-03 | 4.46374E-04 | -1.08604E-04 | 5.40495E-06 | 0.00000E+00 |

FIG. 11

OPTICAL IMAGING SYSTEM AND PORTABLE ELECTRONIC DEVICE INCLUDING THE SAME

CROSS-REFERENCE TO RELATED APPLICATIONS

This application is a continuation of U.S. patent application Ser. No. 15/615,927 filed on Jun. 7, 2017, which claims the benefit under 35 USC 119(a) of Korean Patent Application No. 10-2016-0182148 filed on Dec. 29, 2016, in the Korean Intellectual Property Office, the entire disclosure of which is incorporated herein by reference for all purposes.

BACKGROUND

1. Field

This application relates to an optical imaging system and a portable electronic device including the same.

2. Description of Related Art

Recently, mobile communications terminals have been provided with cameras, enabling video calling and image capturing. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in implementing camera modules having high levels of resolution and performance.

Telephoto lenses, particularly, have a relatively long focal length and overall length, and it is thus difficult to mount the telephoto lenses in the mobile communications terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a plurality of lenses disposed along an optical axis; and a reflection member disposed to be closer to an object than all of the plurality of lenses and having a reflection surface configured to change a path of light; wherein the plurality of lenses are spaced apart from each other by preset distances along the optical axis; and the condition $0.8 < TTL/ft < 1.1$ is satisfied, where TTL is a distance from an object-side surface of a lens closest to the object among the plurality of lenses to an imaging plane of an image sensor, and ft is an overall focal length of an optical system including the plurality of lenses.

The plurality of lenses may include a first lens, a second lens, a third lens, a fourth lens, and a fifth lens sequentially disposed in numerical order beginning with the first lens from an object side of the optical system toward an image side of the optical system; and the condition $1.5 < ft/ft1 < 3.5$ may be satisfied, where ft1 is a focal length of the first lens.

The first lens may have a positive refractive power; and an object-side surface and an image-side surface of the first lens may be convex.

The second lens may have a negative refractive power; and an image-side surface of the second lens may be concave.

The third lens may have a positive refractive power or a negative refractive power; an object-side surface of the third lens may be convex; and an image-side surface of the third lens may be concave.

The fourth lens may have a positive refractive power; an object-side surface of the fourth lens may be concave; and an image-side surface of the fourth lens may be convex.

The fifth lens may have a negative refractive power; an object-side surface of the fifth lens may be concave; and an image-side surface of the fifth lens may be convex.

Object-side surfaces and image-side surfaces of the first, second, third, fourth, and fifth lenses may be aspherical.

The first, second, third, fourth, and fifth lenses may be plastic lenses.

The optical imaging system may further include a stop disposed in front of the first lens; and an effective diameter of a lens having a maximum effective diameter among the first, second, third, fourth, and fifth lenses may be greater than a diameter of the stop.

The plurality of lenses may include a first lens having a positive refractive power; a second lens having a negative refractive power; a third lens having a positive refractive power; a fourth lens having a positive refractive power; and a fifth lens having a negative refractive power; and the first, second, third, fourth, and fifth lenses may be sequentially disposed in numerical order beginning with the first lens from an object side of the optical system toward an image side of the optical system.

The plurality of lenses may include a first lens having a positive refractive power; a second lens having a negative refractive power; a third lens having a negative refractive power; a fourth lens having a positive refractive power; and a fifth lens having a negative refractive power; and the first, second, third, fourth, and fifth lenses may be sequentially disposed in numerical order beginning with the first lens from an object side of the optical system toward an image side of the optical system.

In another general aspect, a portable electronic device includes a first optical imaging system; a second optical imaging system; and a third optical imaging system; wherein the first, second, and third optical imaging systems have different fields of view; and a direction of an optical axis of an optical imaging system having a narrowest field of view among the first, second, and third optical imaging systems is different from a direction of optical axes of remaining ones of the first, second, and third optical imaging systems.

The condition $1.8 < FOVw/FOVt < 4.5$ may be satisfied, where FOVt is a field of view of the optical imaging system having the narrowest field of view among the first, second, and third optical imaging systems, and FOVw is a field of view of an optical imaging system having a widest field of view among the first, second, and third optical imaging systems.

The condition $2.0 < ft/fw < 5.0$ may be satisfied, where ft is an overall focal length of the optical imaging system having the narrowest field of view among the first, second, and third optical imaging systems, and fw is an overall focal length of an optical imaging system having a widest field of view among the first, second, and third optical imaging systems.

In another general aspect, an optical imaging system includes an optical system including a plurality of lenses configured to be movable as a fixed unit along an optical axis to focus on objects at different distances while maintaining a fixed positional relationship between the plurality of lenses; and a reflection member configured to reflect light from an object into an object side of the optical system; wherein a field of view of the optical system changes as the optical system moves along the optical axis; and the condition $0.8<TTL/ft<1.1$ is satisfied, where TTL is a distance from an object-side surface of a lens closest to the object among the plurality of lenses to an imaging plane of an image sensor, and ft is an overall focal length of the optical system.

The optical system may include a first lens having a positive refractive power; a second lens having a negative refractive power; a third lens having a positive refractive power or a negative refractive power; a fourth lens having a positive refractive power; and a fifth lens having a negative refractive power; and the first, second, third, fourth, and fifth lenses may be sequentially arranged in numerical order beginning with the first lens from the object side of the optical system toward an image side of the optical system.

The condition $1.5<ft/ft1<3.5$ may be satisfied, where ft is an overall focal length of an optical system, and ft1 is a focal length of the first lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. In particular, the shapes of spherical surfaces or aspherical surfaces illustrated in the drawings are illustrated by way of example. That is, the shapes of the spherical surfaces or the aspherical surfaces are not limited to the specific shapes illustrated in the drawings.

Figure 1:
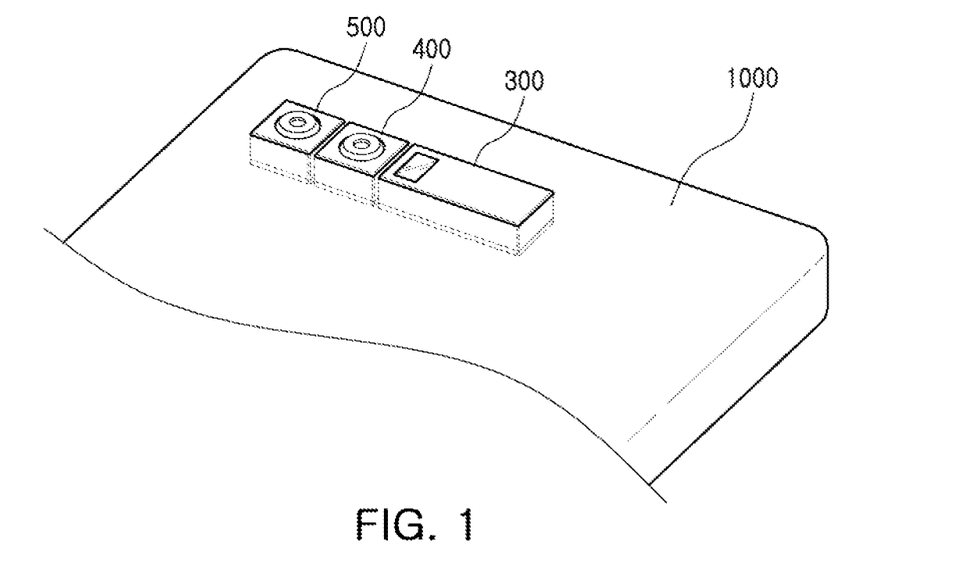
FIG. 1 is a perspective view illustrating an example of a portable electronic device.

FIG. 1 is a perspective view illustrating an example of a portable electronic device.

Referring to FIG. 1, a portable electronic device 1000 includes a plurality of optical imaging systems, and each of the plurality of optical imaging systems includes a plurality of lenses.

In the example illustrated in FIG. 1, the portable electronic device 1000 includes a first optical imaging system 300, a second optical imaging system 400, and a third optical imaging system 500.

The first optical imaging system 300, the second optical imaging system 400, and the third optical imaging system 500 have different fields of view (FOVs).

In one example, the first optical imaging system 300 has the narrowest field of view (first telephoto, 3×), the second optical imaging system 400 (second telephoto, 2×) has a field of view wider than that of the first optical imaging system 300, and the third optical imaging system 500 has the widest field of view (wide angle, 1×).

In one example, the field of view (FOVt) of the first optical imaging system 300 is less than or equal to 40°, the field of view (FOVm) of the second optical imaging system 400 is greater than or equal to 40°, and the field of view (FOVw) of the third optical imaging system 500 is in a range of 75° or more to 95° or less. However, these are only examples, and the fields of view of the first optical imaging system 300, the second optical imaging system 400, and the third optical imaging system 500 may have other values as long as the first optical imaging system 300 has the narrowest field of view, the third optical imaging system 500 has the widest field of view, and the second optical imaging system 400 has a field of view between the field of view of the first optical imaging system 300 and the field of view of the third optical imaging system 500.

As described above, the three optical imaging systems are designed to have different fields of view to capture an image of a subject at various distances and implement a zoom function.

In addition, a zoom magnification of 3× may be implemented, and an increase in a thickness of the portable electronic device 100 may be prevented.

Further, since an image having a high level of resolution or a bright image may be generated by using (for example, synthesizing) two images for one subject, an image of the subject may be clearly captured even in an environment in which illumination is low.

In one example, an optical axis of the plurality of lenses in the second optical imaging system 400 and an optical axis of the plurality of lenses in the third optical imaging system 500 are oriented in a thickness direction (a direction from a front surface of the portable electronic device 1000 toward a rear surface thereof, or in an opposite direction to such a direction) of the portable electronic device 1000, while an optical axis of the plurality of lenses of the first optical imaging system 300, having the narrowest field of view, is oriented perpendicular to the thickness direction of the portable electronic device 1000.

That is, a direction of an optical axis of an optical imaging system having the narrowest field of view among the first, second, and third optical imaging systems 300, 400, and 500 is different from a direction of an optical axis of the other ones of the optical imaging systems.

In one example, the optical axis (a Z axis) of the plurality of lenses constituting the first optical imaging system 300 is oriented in a width direction or a length direction of the portable electronic device 1000.

Therefore, an entire length of the first optical imaging system 300 does not have an influence on a thickness of the portable electronic device 1000. Accordingly, the portable electronic device 100 may be miniaturized.

Since the optical axis of the first optical imaging system 300 is oriented to be perpendicular to the thickness direction of the portable electronic device 1000, the first optical imaging system 300 changes a path of light incident in the thickness direction of the portable electronic device 1000.

In one example, the first optical imaging system 300 includes a reflection member P having a reflection surface that changes the path of the light. The reflection member P may be a mirror or a prism that changes the path of the light.

The first optical imaging system 300 and the third optical imaging system 500 satisfy the following Conditional Expressions:

$$1.8 < FOVw/FOVt < 4.5 \quad \text{[Conditional Expression 1]}$$

$$2.0 < ft/fw < 5.0. \quad \text{[Conditional Expression 2]}$$

In the above Conditional Expressions, FOVw is a field of view of the third optical imaging system 500, FOVt is a field of view of the first optical imaging system 300, ft is a focal length of the first optical imaging system 300, and fw is a focal length of the third optical imaging system 500.

The first optical imaging system 300 will hereinafter be described with reference to FIGS. 2 through 11.

The first optical imaging system 300 includes a plurality of lenses disposed along an optical axis. The plurality of lenses are spaced apart from each other by preset distances along the optical axis.

In the examples described herein, the first optical imaging system 300 includes five lenses.

In the examples described herein, first lens is a lens closest to an object, while a fifth lens is a lens closest to an image sensor.

In addition, a first surface of a lens is a surface of the lens closest to an object side of the lens (i.e., an object-side surface), and a second surface of a lens is a surface of the lens closest to an image side of the lens (i.e., an image-side surface). Further, all numerical values of radii of curvature, thicknesses of lenses, and other parameters are expressed in millimeters (mm), and angles are expressed in degrees.

Further, a statement that one surface of a lens is convex means that a paraxial region of that surface is convex, and a statement that one surface of a lens is concave means that a paraxial region of that surface is concave. Therefore, although a surface of a lens may be described as being convex, an edge portion of that surface may be concave. Likewise, although a surface of a lens may be described as being concave, an edge portion of that surface may be convex.

A paraxial region of a surface is a very narrow region in the vicinity of an optical axis of the surface.

In examples described herein, the first optical imaging system includes a first lens, a second lens, a third lens, a fourth lens, and a fifth lens sequentially disposed in numerical order beginning with the first lens from the object side.

However, the first optical imaging system in the examples described herein is not limited to only including five lenses, but further includes other components in addition to the five lenses.

For example, the first optical imaging system further includes an image sensor that converts an image of a subject incident on the image sensor into an electrical signal.

In addition, the first optical imaging system further includes an infrared cut-off filter that blocks infrared light. The infrared cut-off filter is disposed between a lens (the fifth lens) closest to the image sensor and the image sensor. However, this is merely an example, and the infrared cut-off filter may be disposed at other positions in the first optical imaging system.

In addition, the first optical imaging system further includes a reflection member having a reflection surface that changes a path of light. For example, the reflection member may be a mirror or a prism.

The reflection member is closer to the object than any of the lenses of the first optical imaging system. Therefore, a lens closest to the object is a lens closest to the reflection member.

At least the first to fifth lenses of the first optical imaging system move along the optical axis for auto-focusing (AF). The reflection member and the infrared cut-off filter of the first optical imaging system may or may not move along the optical axis for auto-focusing (AF).

In the first optical imaging system in the examples described herein, all of the lenses are plastic lenses.

In addition, the first to fifth lenses each have at least one aspherical surface.

That is, at least one of first and second surfaces of all of the first to fifth lenses is aspherical. The aspherical surfaces of the first to fifth lenses are represented by the following Equation 1:

$$Z = \frac{cY^2}{1 + \sqrt{1 - (1+K)c^2Y^2}} + AY^4 + BY^6 + CY^8 + DY^{10} + EY^{12} + FY^{14} + \ldots. \quad \text{[Equation 1]}$$

In Equation 1, c is a curvature (an inverse of a radius of curvature) of a lens, K is a conic constant, and Y is a distance from a certain point on an aspherical surface of the lens to an optical axis of the lens in a direction perpendicular to the optical axis. In addition, constants A to F are aspherical coefficients. In addition, Z is a distance between the certain point on the aspherical surface of the lens at the distance Y and a tangential plane meeting the apex of the aspherical surface of the lens. The ellipsis . . . in Equation 1 indicates that additional terms $GY^{16}$, $HY^{18}$, $JY^{20}$, and so on may be added to further refine the shape of the aspherical surface.

In one example, the first optical imaging system including the first to fifth lenses has positive, negative, positive, positive, negative refractive powers sequentially in the order listed beginning from the object side of the first imaging optical system.

In another example, the first optical imaging system including the first to fifth lenses has positive, negative, negative, positive, negative refractive powers sequentially in the order listed beginning from the object side of the first imaging optical system.

The first optical imaging system in the examples described herein satisfies the following Conditional Expressions:

$$0.8 < TTL/ft < 1.1 \quad \text{[Conditional Expression 3]}$$

$$1.5 < ft/ft1 < 3.5. \quad \text{[Conditional Expression 4]}$$

In the above Conditional Expressions, TTL is a distance from an object-side surface of the first lens of the first optical imaging system to an imaging plane of the image sensor, ft is an overall focal length of the first optical imaging system, and ft1 is a focal length of the first lens of the first optical imaging system.

Next, the first to fifth lenses constituting the optical imaging system in the examples described herein will be described.

The first lens has a positive refractive power.

In addition, both surfaces of the first lens are convex. In detail, first and second surfaces of the first lens are convex in the paraxial region.

At least one of the first and second surfaces of the first lens is aspherical. In one example, both surfaces of the first lens are aspherical.

The second lens has a negative refractive power.

In one example, a first surface of the second lens is flat in the paraxial region, and a second surface thereof is concave in the paraxial region.

In another example, the second lens has a meniscus shape, of which an object-side surface is convex. In detail, the first surface of the second lens is convex in the paraxial region, and the second surface thereof is concave in the paraxial region.

At least one of the first and second surfaces of the second lens is aspherical. In one example, both surfaces of the second lens are aspherical.

The third lens has a positive refractive power or a negative refractive power.

In addition, the third lens has a meniscus shape, of which an object-side surface is convex. In detail, a first surface of the third lens is convex in the paraxial region, and a second surface thereof is concave in the paraxial region.

At least one of the first and second surfaces of the third lens is aspherical. In one example, both surfaces of the third lens are aspherical.

The fourth lens has a positive refractive power.

In addition, the fourth lens has a meniscus shape, of which an image-side surface is convex. In detail, a first surface of the fourth lens is concave in the paraxial region, and a second surface thereof is convex in the paraxial region.

At least one of the first and second surfaces of the fourth lens is aspherical. In one example, both surfaces of the fourth lens are aspherical.

The fifth lens has a negative refractive power.

In addition, the fifth lens has a meniscus shape, of which an image-side surface is convex. In detail, a first surface of the fifth lens is concave in the paraxial region, and a second surface thereof is convex in the paraxial region.

At least one of the first and second surfaces of the fifth lens is aspherical. In one example, both surfaces of the fifth lens are aspherical.

In the first optical imaging system configured as described above, a plurality of lenses perform an aberration correction function to thus increase an aberration improvement performance.

In addition, the first optical imaging system in the examples described here has a telephoto ratio (TTL/ft) between 0.8 and 1.1, to have features of a telephoto lens and a field of view (FOV) of 40° or less. Therefore, a narrow FOV may be implemented.

An example of a first optical imaging system will now be described with reference to FIGS. 2 through 6.

Figure 2:
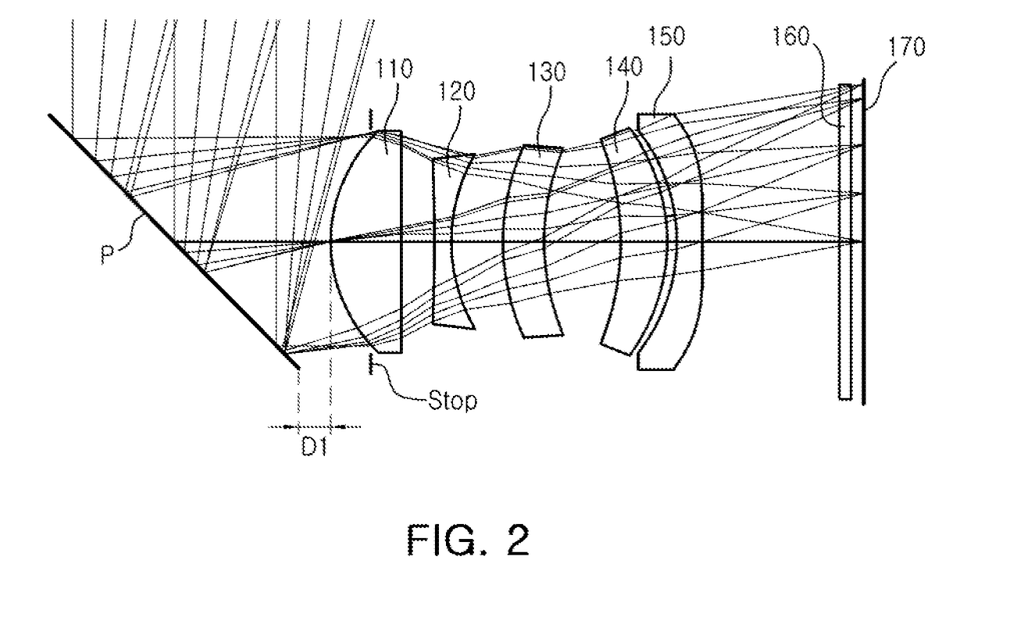
FIG. 2 is a view illustrating an example of a first optical imaging system.
Figure 3:
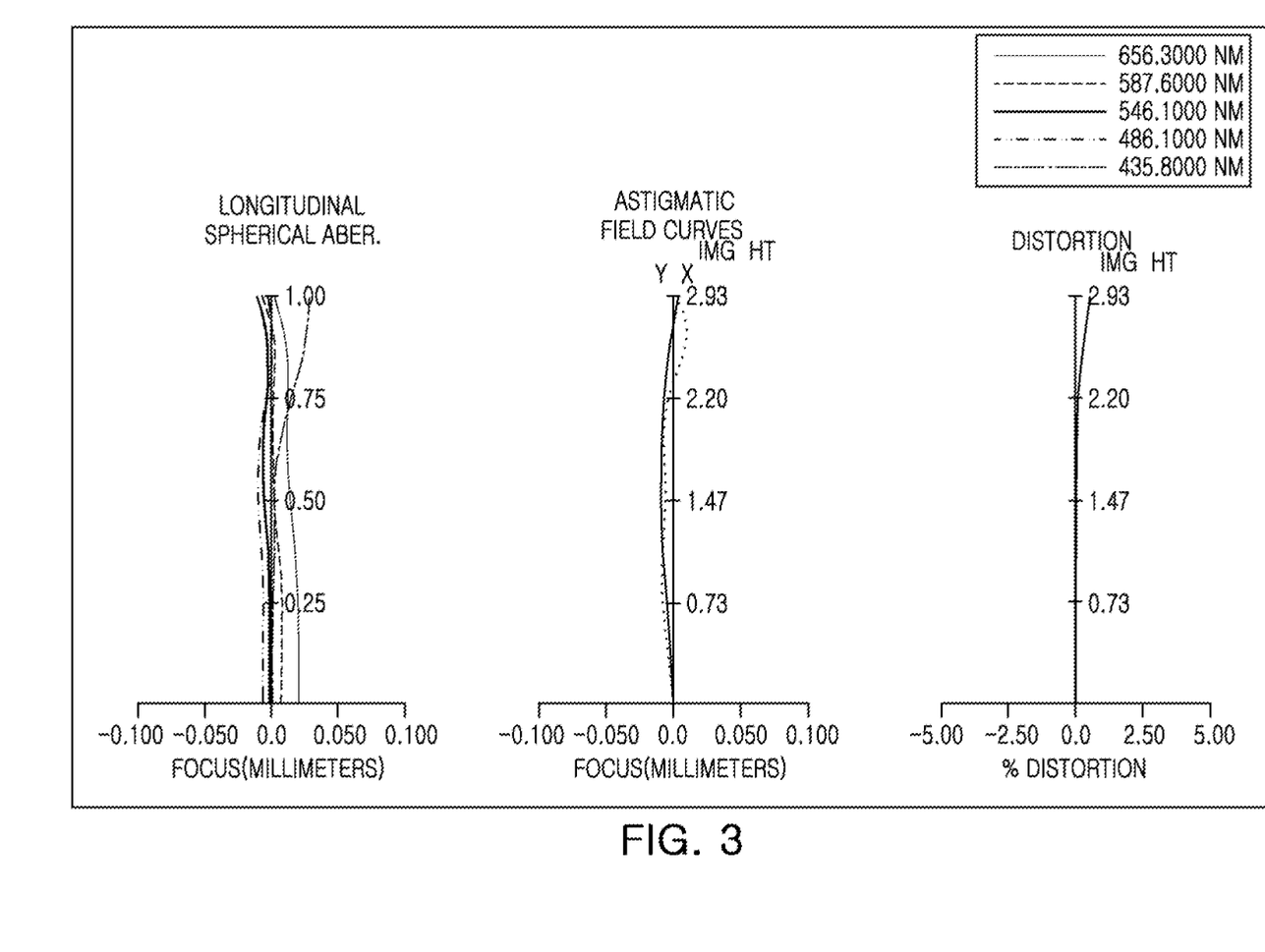
FIG. 3 is graphs showing curves illustrating aberration characteristics of the first optical imaging system illustrated in FIG. 2.
Figure 4:
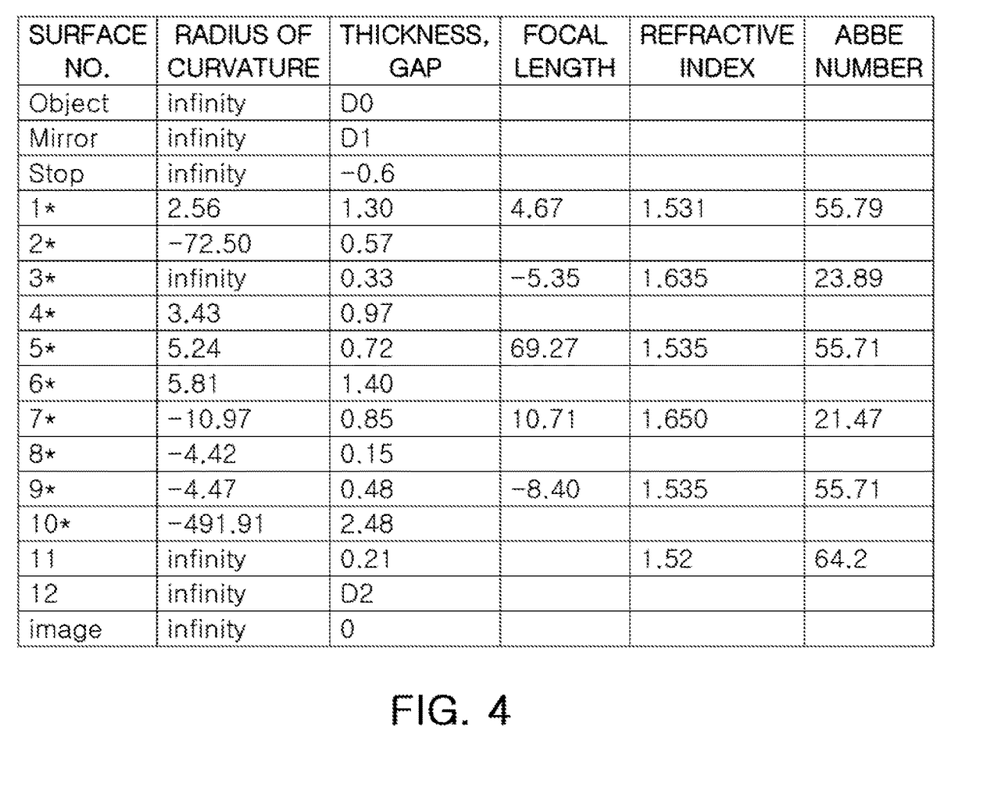
FIGS. 4 and 5 are tables listing characteristics of lenses of the first optical imaging system illustrated in FIG. 2.
Figure 5:
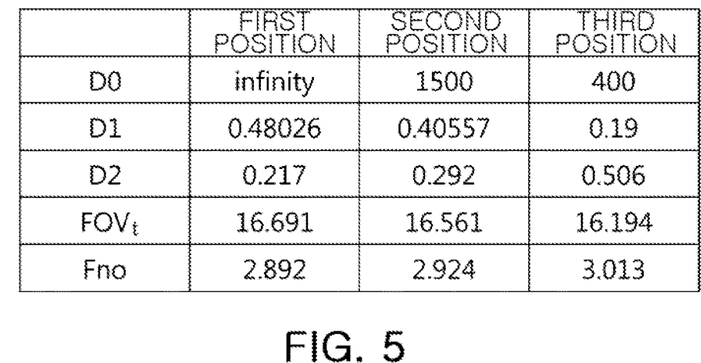
Figure 6:
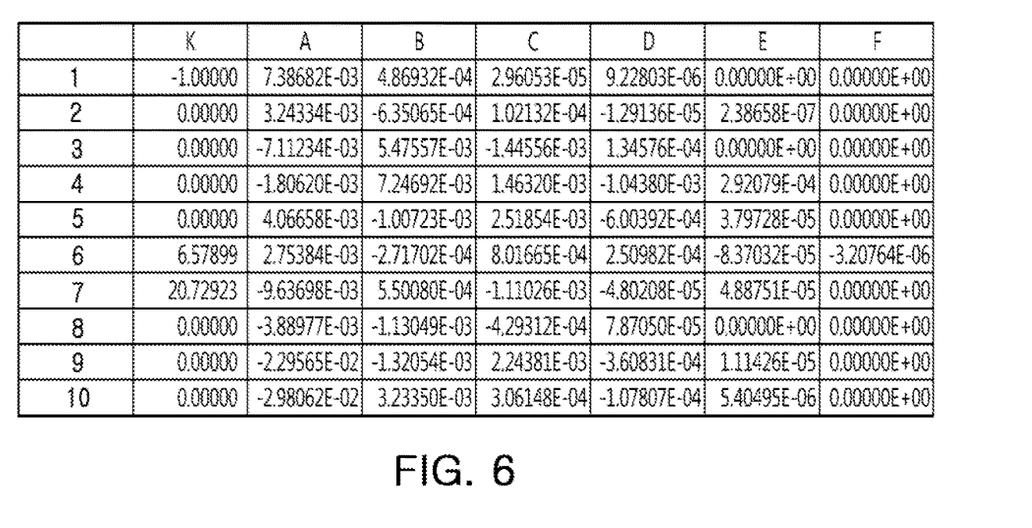
FIG. 6 is a table listing aspherical coefficients of lenses of the first optical imaging system illustrated in FIG. 2.

FIG. 2 is a view illustrating an example of a first optical imaging system. FIG. 3 is graphs showing curves illustrating aberration characteristics of the first optical imaging system illustrated in FIG. 2. FIGS. 4 and 5 are tables listing characteristics of lenses of the first optical imaging system illustrated in FIG. 2. FIG. 6 is a table listing aspherical coefficients of lenses of the first optical imaging system illustrated in FIG. 2.

Referring to FIG. 2, the first optical imaging system includes an optical system including a first lens 110, a second lens 120, a third lens 130, a fourth lens 140, a fifth lens 150, an infrared cut-off filter 160, and an image sensor 170.

In addition, the first optical imaging system includes a reflection member P closer to an object than the first lens 110, and having a reflection surface that changes a path of light. In the example illustrated in FIG. 2, the reflection member P is a mirror that changes the path of the light.

Respective characteristics (radii of curvature, thicknesses or distances (gaps) between lenses, refractive indices, and Abbe numbers) of lenses are illustrated in FIG. 4.

Since the first optical imaging system moves along an optical axis for auto-focusing, a first position, a second position, and a third position in the table illustrated in FIG. 5 refer to positions of the first optical imaging system depending on a distance from the first optical imaging system to a subject whose image is being captured. In the table illustrated in FIG. 5, D0 is the distance between the object and the reflection member P, D1 is the distance between the reflection member P and the first surface of the first lens 110, and D2 is the distance between the second surface of the infrared cut-off filter 160 and the image sensor 170. As can be seen from the table illustrated in FIG. 5, in this example, the first lens 110 to the fifth lens 150 and the infrared cut-off filter 160 move along the optical axis for auto-focusing, but the reflection member P does not move along the optical axis for auto-focusing.

For example, in the table illustrated in FIG. 5, the first position is a position of the first optical imaging system when capturing an image of a subject at infinity, the second position is a position of the first optical imaging system when capturing an image of a subject at a normal distance, for example, about 1.5 m, and the third position is a position of the first optical imaging system when capturing an image of a subject at a macro distance, for example, about 0.4 m.

A ratio (FOVt1/FOVt3) of a field of view (FOVt1) in the first position to a field of view (FOVt3) in the third position, that is, a ratio of a maximum field of view to a minimum field of view, is greater than 1 and less than 1.5.

In the example illustrated in FIGS. 2 through 6, the distance TTL from the object-side surface of the first lens 110 of the first optical imaging system to the imaging plane of the image sensor 170 is 9.68 mm, an overall focal length ft of the first optical imaging system is 10.7 mm, and an f-number Fno of the first optical imaging system is in a range of 2.6 to 3.1.

In the example illustrated in FIGS. 2 through 6, the first lens 110 has a positive refractive power, and a first surface and a second surface thereof are convex in the paraxial region.

The second lens 120 has a negative refractive power, a first surface thereof is flat in the paraxial region, and a second surface thereof is concave in the paraxial region.

The third lens 130 has a positive refractive power, a first surface thereof is convex in the paraxial region, and a second surface thereof is concave in the paraxial region.

The fourth lens 140 has a positive refractive power, a first surface thereof is concave in the paraxial region, and a second surface thereof is convex in the paraxial region.

The fifth lens 150 has a negative refractive power, a first surface thereof is concave in the paraxial region, and a second surface thereof is convex in the paraxial region.

Surfaces of the first to fifth lenses 110 to 150 have aspherical coefficients as illustrated in FIG. 6. In this example, all object-side surfaces and all image-side surfaces of the first to fifth lenses 110 to 150 are aspherical.

In the example illustrated in FIG. 2, a stop is disposed in front of the first lens 110, and an effective diameter of at least one of the first to fifth lenses 110 to 150 is greater than a diameter of the stop. In the example illustrated in FIG. 2, the first surface of the first lens 110 protrudes through the stop, but the stop is nevertheless considered to be disposed in front of the first lens 110.

In one example, an effective diameter of a lens having a maximum effective diameter among the first to fifth lenses 110 to 150 is greater than the diameter of the stop.

The first optical imaging system configured as described above has aberration characteristics illustrated in FIG. 3.

Another example of a first optical imaging system will be described with reference to FIGS. 7 through 11.

Figure 7:
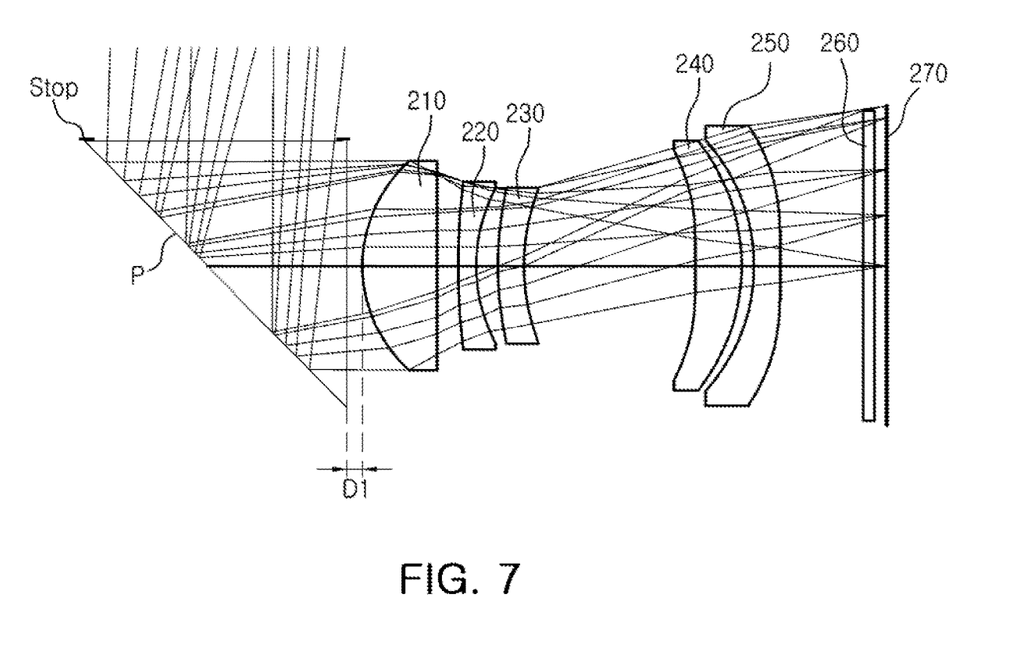
FIG. 7 is a view illustrating another example of a first optical imaging system.
Figure 8:
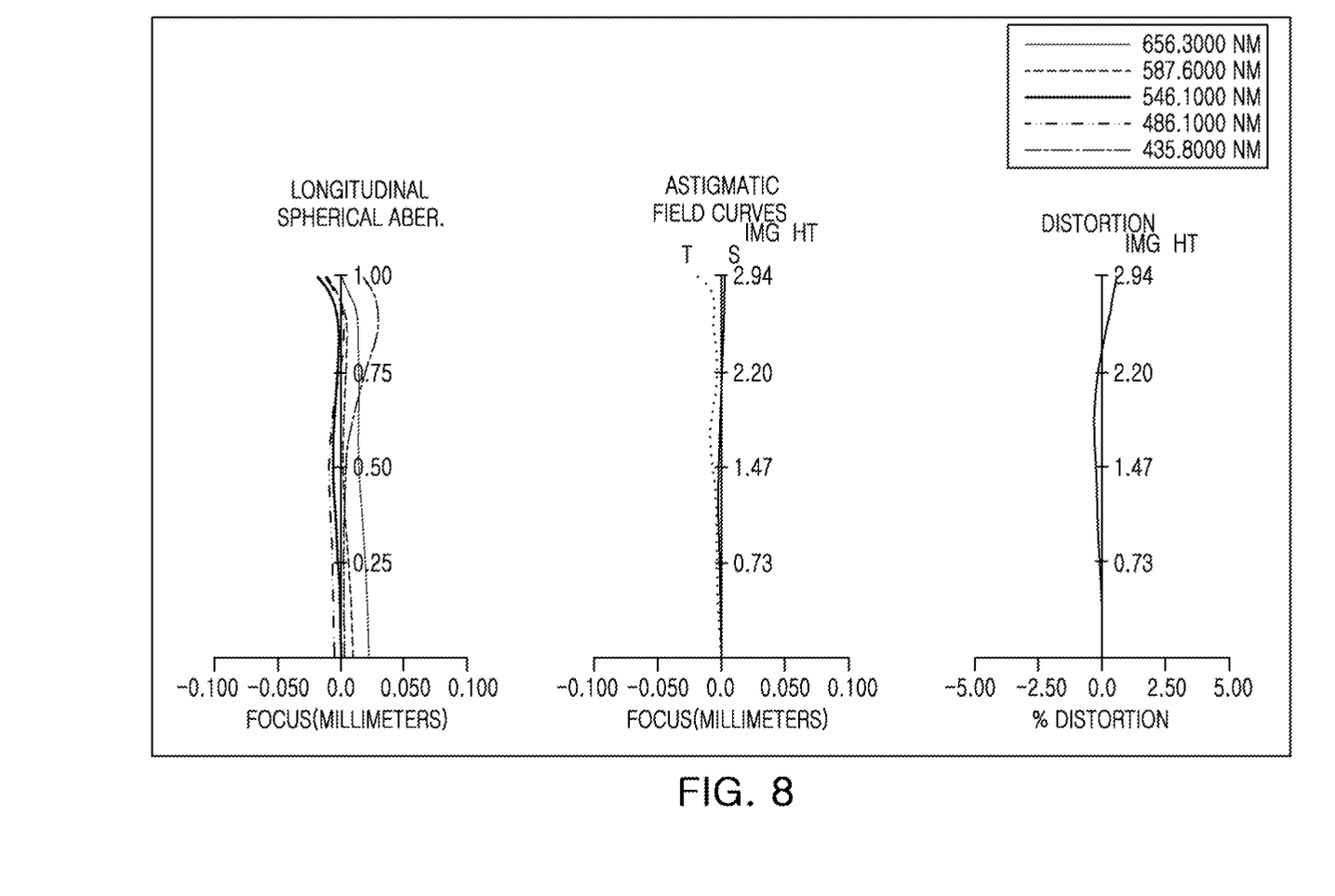
FIG. 8 is graphs showing curves illustrating aberration characteristics of the first optical imaging system illustrated in FIG. 7.
Figure 9:
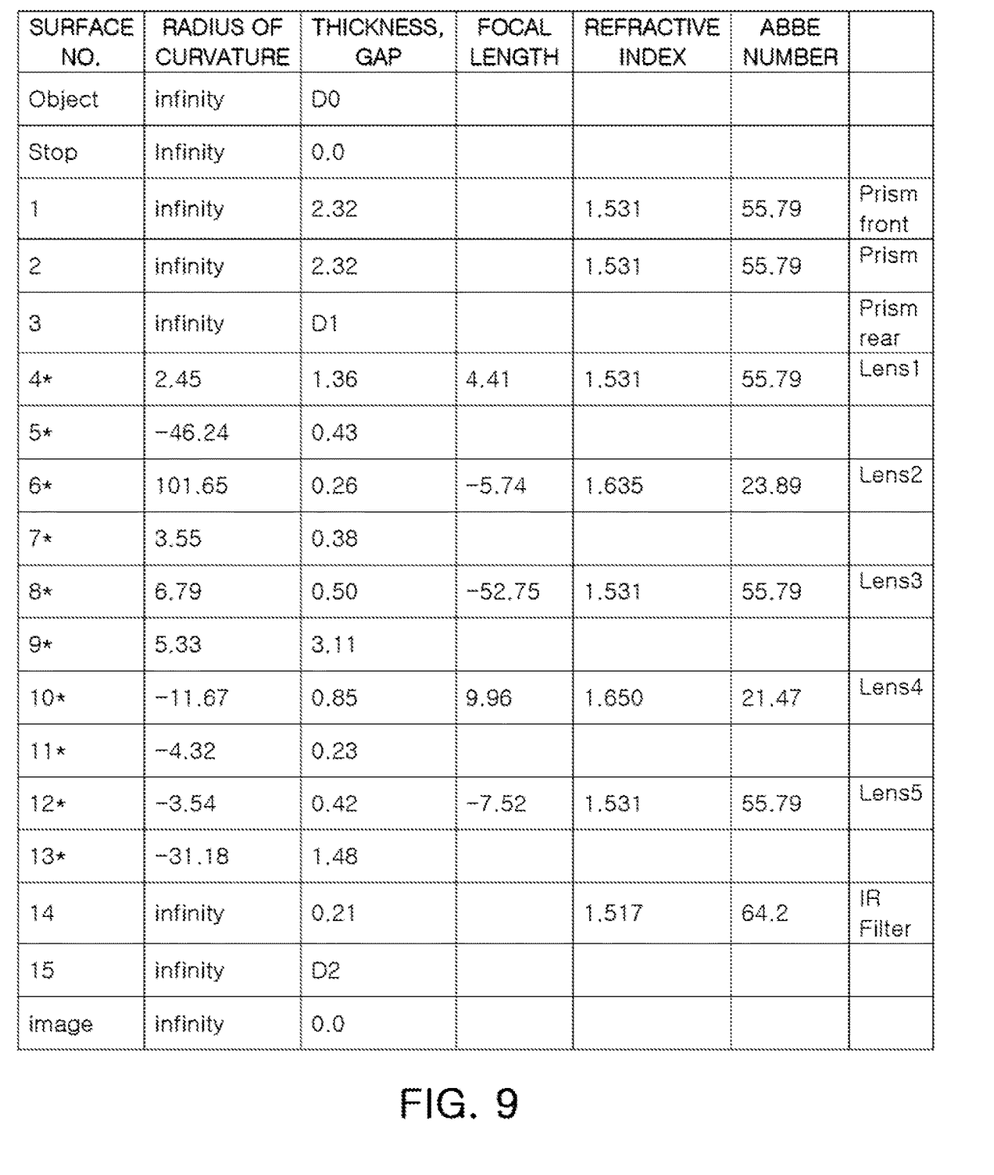
FIGS. 9 and 10 are tables listing characteristics of lenses of the first optical imaging system illustrated in FIG. 7.
Figure 10:
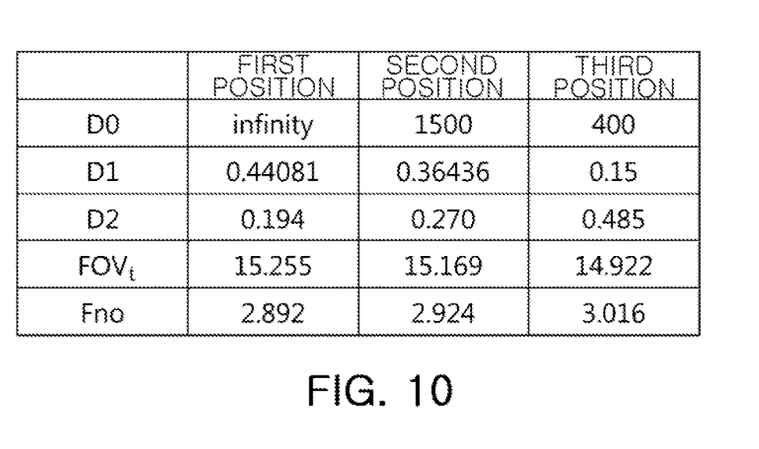
Figure 11:
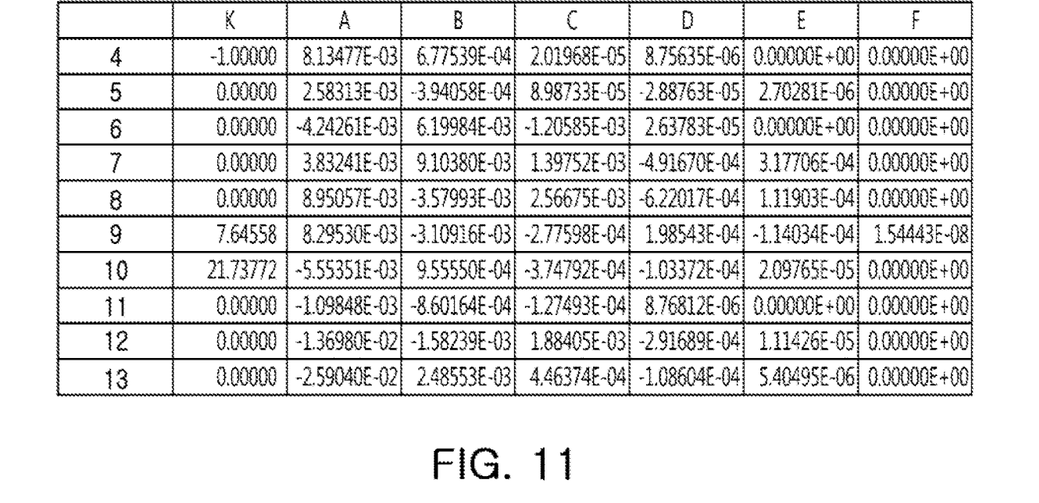
FIG. 11 is a table listing aspherical coefficients of lenses of the first optical imaging system illustrated in FIG. 7.

FIG. 7 is a view illustrating another example of a first optical imaging system. FIG. 8 is graphs showing curves illustrating aberration characteristics of the first optical imaging system illustrated in FIG. 7. FIGS. 9 and 10 are tables listing characteristics of lenses of the first optical imaging system illustrated in FIG. 7. FIG. 11 is a table listing aspherical coefficients of lenses of the first optical imaging system illustrated in FIG. 7.

Referring to FIG. 7, the first optical imaging system includes an optical system including a first lens 210, a second lens 220, a third lens 230, a fourth lens 240, a fifth lens 250, an infrared cut-off filter 260, and an image sensor 270.

In addition, the first optical imaging system includes a reflection member P closer to an object than the first lens 210, and having a reflection surface that changes a path of light. In the example illustrated in FIG. 7, the reflection member P is a prism that changes the path of the light, in contrast to the example illustrated in FIG. 2, in which the reflection member P is a mirror that changes the path of the light.

Respective characteristics (radii of curvature, thicknesses or distances (gaps) between lenses, refractive indices, and Abbe numbers) of lenses are illustrated in FIG. 9.

Since the first optical imaging system moves along an optical axis for auto-focusing, a first position, a second position, and a third position in the table illustrated in FIG. 10 refer to positions of the first optical imaging system depending on a distance from the first optical imaging system to a subject whose image is being captured. In the table illustrated in FIG. 10, D0 is the distance between the object and the reflection member P, D1 is the distance between the reflection member P and the first surface of the first lens 210, and D2 is the distance between the second surface of the infrared cut-off filter 260 and the image sensor 270. As can be seen from the table illustrated in FIG. 10, in this example, the first lens 210 to the fifth lens 250 and the infrared cut-off filter 260 move along the optical axis for auto-focusing, but the reflection member P does not move along the optical axis for auto-focusing.

For example, in the table illustrated in FIG. 10, the first position is a position of the first optical imaging system when capturing an image of a subject at infinity, the second position is a position of the first optical imaging system capturing an image of a subject at a normal distance, for example, about 1.5 m, and the third position is a position of the first optical imaging system when capturing an image of a substance at a macro distance, for example, 0.4 m.

A ratio (FOVt1/FOVt3) of a field of view (FOVt1) in the first position to a field of view (FOVt3) in the third position, that is, a ratio of a maximum field of view to a minimum field of view, is greater than 1 and less than 1.5.

In the example illustrated in FIGS. 7 through 11, the distance TTL from the object-side surface of the first lens 210 of the first optical imaging system to the imaging plane of the image sensor 270 is 9.42 mm, an overall focal length ft of the first optical imaging system is 10.7 mm, and an f-number Fno of the first optical imaging system is in a range of 2.6 to 3.1.

In the example illustrated in FIG. 7 through 11, the first lens 210 has a positive refractive power, and a first surface and a second surface thereof are convex in the paraxial region.

The second lens 220 has a negative refractive power, a first surface thereof is convex in the paraxial region, and a second surface thereof is concave in the paraxial region.

The third lens 230 has a negative refractive power, a first surface thereof is convex in the paraxial region, and a second surface thereof is concave in the paraxial region.

The fourth lens 240 has a positive refractive power, a first surface thereof is concave in the paraxial region, and a second surface thereof is convex in the paraxial region.

The fifth lens 250 has a negative refractive power, a first surface thereof is concave in the paraxial region, and a second surface thereof is convex in the paraxial region.

Surfaces of the first to fifth lenses 210 to 250 have aspherical coefficients as illustrated in FIG. 11. In this example, all object-side surfaces and all image-side surfaces of the first to fifth lenses 210 to 250 are aspherical.

In the example illustrated in FIG. 7, a stop is disposed in front of the reflection member P, and an effective diameter of at least one of the first to fifth lenses 210 to 250 is greater than a diameter of the stop.

In one example, an effective diameter of a lens having a maximum effective diameter among the first to fifth lenses 210 to 250 is greater than the diameter of the stop.

The first optical imaging system configured as described above has aberration characteristics illustrated in FIG. 8.

According to the examples described above, an optical imaging system having a narrow field of view and being slim, and a portable electronic device including the same, may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising a first optical imaging system, a second optical imaging system, and a third optical imaging system, having different fields of view,
wherein an optical imaging system having a narrowest field of view, among the first, second, and third optical imaging systems, comprises:
a reflection member having a reflection surface configured to change a path of light;
a first lens having positive refractive power, and having a convex object-side surface and a convex image-side surface;
a second lens having negative refractive power, and having a convex object-side surface and a concave image-side surface;
a third lens having a convex object-side surface and a concave image-side surface;
a fourth lens; and
a fifth lens,
wherein the first, second, third, fourth, and fifth lenses are sequentially arranged to be spaced apart from each other in numerical order from an object side along an optical axis, and are arranged to be closer to an image sensor than the reflection member,
wherein the optical imaging system having the narrowest field of view satisfies the following conditional expressions:

$0.8 < TTL/ft < 1.1$, and $1.5 < ft/ft1 < 3.5$ where TTL is a distance from the object-side surface of the first lens to an imaging plane of the image sensor, ft is an overall focal length of the optical imaging system having the narrowest field of view, and ft1 is a focal length of the first lens.

2. The optical imaging system according to claim 1, wherein the first lens, among the first to fifth lenses, has a smallest absolute value of focal length.

3. The optical imaging system according to claim 2, wherein the second lens, among the first to fifth lenses, has a second-smallest absolute value of focal length.

4. The optical imaging system according to claim 3, wherein the third lens, among the first to fifth lenses, has a largest absolute value of focal length.

5. The optical imaging system according to claim 4, wherein a distance between the third lens and the fourth lens on the optical axis is longer than a distance between other lenses on the optical axis.

6. The optical imaging system according to claim 5, wherein the fourth lens has positive refractive power, and has a concave object-side surface and a convex image side surface.

7. The optical imaging system according to claim 6, wherein the fifth lens has negative refractive power, and has a concave object-side surface.

8. The optical imaging system according to claim 7, wherein the third lens has negative refractive power.

9. The optical imaging system according to claim 2, wherein a thickness of the first lens on the optical axis is thickest among the first to fifth lenses.

10. The optical imaging system according to claim 9, wherein a thickness of the fourth lens on the optical axis is second-thickest among the first to fifth lenses.

11. The optical imaging system according to claim 10, wherein a thickness of the third lens on the optical axis is third-thickest among the first to fifth lenses.

12. The optical imaging system according to claim 1, wherein the optical imaging system satisfies the following conditional expression:

$FOVt \leq 40°$ where FOVt is a field of view of the first optical imaging system having a narrowest field of view.

13. The optical imaging system according to claim 12, wherein the optical imaging system satisfies the following conditional expression:

$FOVm \geq 40°$ where FOVm is a field of view of the second optical imaging system, narrower than that of the third imaging optical system.

14. The optical imaging system according to claim 13, wherein the optical imaging system satisfies the following conditional expression:

$1.8 < FOVw/FOVt$ where FOVw is a field of view of the third imaging optical system.

15. The optical imaging system according to claim 1, wherein the first lens and the second lens are made of a plastic material having different Abbe numbers.

16. The optical imaging system according to claim 1, wherein the fourth lens and the fifth lens are made of a plastic material having different Abbe numbers.

17. The optical imaging system according to claim 1, wherein a direction of an optical axis of an optical imaging system having a narrowest field of view, among the first, second, and third optical imaging systems, is different from a direction of optical axes of remaining optical imaging systems among the first, second, and third optical imaging systems.

* * * * *